United States Patent
Hammer

(10) Patent No.: US 12,466,484 B2
(45) Date of Patent: Nov. 11, 2025

(54) MODULAR VEHICLE FRAME FOR AN ELECTRIC VEHICLE

(71) Applicant: Robert Bosch GmbH, Stuttgart (DE)

(72) Inventor: Uwe Hammer, Rosenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/574,836

(22) PCT Filed: May 31, 2022

(86) PCT No.: PCT/EP2022/064715
§ 371 (c)(1),
(2) Date: Dec. 28, 2023

(87) PCT Pub. No.: WO2023/285021
PCT Pub. Date: Jan. 19, 2023

(65) Prior Publication Data
US 2024/0343307 A1 Oct. 17, 2024

(30) Foreign Application Priority Data
Jul. 12, 2021 (DE) .................... 10 2021 207 313.1

(51) Int. Cl.
*B62D 21/11* (2006.01)
*F16B 7/18* (2006.01)
(52) U.S. Cl.
CPC ............... *B62D 21/11* (2013.01); *F16B 7/18* (2013.01)
(58) Field of Classification Search
CPC ........ B62D 21/11; B62D 21/02; B62D 21/08; F16B 7/18
See application file for complete search history.

(56) References Cited

U.S. PATENT DOCUMENTS

| | | | | |
|---|---|---|---|---|
| 1,493,736 A | * | 5/1924 | Collins | ........... B62D 21/02 280/796 |
| 2015/0298739 A1 | * | 10/2015 | Buschjohann | ...... B62D 21/02 296/193.08 |
| 2021/0061357 A1 | * | 3/2021 | Braun | ............... B62D 21/12 |

FOREIGN PATENT DOCUMENTS

| | | | | |
|---|---|---|---|---|
| CN | 109263722 A | | 1/2019 | |
| CN | 110662690 A | * | 1/2020 | ......... B62D 29/008 |

(Continued)

OTHER PUBLICATIONS

Espace translation of CN 111924006 A (Year: 2020).*

(Continued)

*Primary Examiner* — Jason D Shanske
*Assistant Examiner* — Scott Lawrence Strickler
(74) *Attorney, Agent, or Firm* — Michael Best & Friedrich LLP

(57) ABSTRACT

The present invention relates to a modular vehicle frame (1) for an electric vehicle, comprising a plurality of extruded profiled beams (16, 17, 18, 19), which have, at least in portions, a substantially identical cross-sectional area, wherein: at least one connecting element (6, 7, 8, 9, 10, 11, 12, 13, 14) for an electric motor (2), a steering system (3), a cooler unit and/or a suspension system (4) can be arranged on the plurality of profiled beams (16, 17, 18, 19) by means of a frictional and/or interlocking connection; each profiled beam (16, 17, 18, 19) has a main direction of extension (76); each profiled beam (16, 17, 18, 19) has at least three channels (60, 62, 64) along the main direction of extension (76) which are formed by at least two projections (29) within the profiled beam (16, 17, 18, 19); each channel (60, 62, 64) forms a central axis (78) along the main direction of extension (76); a mounting plane is defined by the central axes (78); and the modular vehicle frame (1) has at least one fastening unit (66) which is designed to fasten the profiled (Continued)

beams (16, 17, 18, 19) substantially orthogonally to the main direction of extension (76), or substantially orthogonally to the main direction of extension (76) in the mounting plane.

16 Claims, 11 Drawing Sheets

(56) References Cited

FOREIGN PATENT DOCUMENTS

| | | | | |
|---|---|---|---|---|
| CN | 111924006 | A | * 11/2020 | ............ B62D 21/09 |
| DE | 4313562 | A1 | 10/1994 | |
| DE | 19506160 | B4 | 5/2006 | |
| DE | 102006012629 | A1 | 10/2007 | |
| DE | 102011089173 | A1 | 6/2013 | |
| DE | 102020119217 | A1 | 1/2022 | |
| EP | 3569480 | A1 | 11/2019 | |
| FR | 3006943 | A1 | 12/2014 | |
| WO | 2018220302 | A1 | 12/2018 | |

OTHER PUBLICATIONS

Espace translation of CN 110662690 A (Year: 2020).*
Translation of International Search Report for Application No. PCT/EP2022/064715 dated Sep. 22, 2022 (2 pages).

* cited by examiner

MODULAR VEHICLE FRAME FOR AN ELECTRIC VEHICLE

BACKGROUND

The present invention further relates to a modular vehicle frame for an electric vehicle.

A variety of vehicle frames are currently known from the prior art in various embodiments. Due to the growing popularity and the broadening range of applications of electric vehicles, there is a need for vehicle frames that are suitable for electric vehicles. However, a group of problems arises due to the high torques that must be transmitted and the increasing individualization of vehicles, which may be broken down to the level of the vehicle frame. Increasing competition in the field of electric vehicles also creates cost pressures, so that particularly cheap vehicle frames are in greater demand.

SUMMARY

The modular vehicle frame for an electric vehicle according to the disclosure has the advantage over the known frame that, due to the identical profile cross-section of the profiled beams, these may be simply and cost-efficiently produced by means of an extrusion process. Thus, the profiled beams may be adapted to different modular vehicle frame concepts. Furthermore, different vehicle frame geometries may be mapped by means of the modular vehicle frame, as the fastening unit can be used to fasten several profiled beams to each other both at the front side and in the longitudinal and transverse direction, in particular by means of a bolted connection. In addition, different connecting elements may be mounted on the profiled beams, which are preferably also extruded, so that further vehicle components may be fastened to the modular vehicle frame. By this, a simplified construction of the modular vehicle frame may be enabled with reduced production costs.

According to the invention, this is achieved in that the modular vehicle frame for an electric vehicle comprises a plurality of extruded profiled beams, which have, at least in portions, a substantially identical cross-sectional area, wherein at least one connecting element for an electric motor, a steering system, a cooler unit, and/or a suspension system can be arranged on the plurality of profiled beams by means of a frictional and/or interlocking connection, wherein each profiled beam has a main direction of extension, wherein each profiled beam has at least three channels along the main direction of extension which are formed by at least two projections within the profiled beam, wherein each channel forms a central axis along the main direction of extension, wherein a mounting plane is defined by the central axes, wherein the modular vehicle frame has at least one fastening unit which is designed to fasten the profiled beams substantially orthogonally to the main direction of extension, or substantially orthogonally to the main direction of extension in the mounting plane.

In other words, by means of a plurality of the extruded profiled beams, a vehicle frame may be formed to which a plurality of profiled beams are fastened to one another by means of the fastening unit. This may be accomplished by means of a bolted connection or the like. For example, the modular vehicle frame may consist of two longitudinal profiled beams and two transverse profiled beams connected by means of bolted connections, as shown in FIG. 2. Connecting elements may be fastened to the profiled beams by means of a frictional and/or interlocking connection, for example a bolted or clamp connection or the like, wherein these connecting elements are connection components, for example, to fasten an electric motor, a steering system, a cooler unit, and/or a suspension system of the electric vehicle to the modular vehicle frame.

The profiled beam forms at least two projections in its inner side, which form the three channels. Each of these channels forms a central axis, which in particular lies in the center of the cross-sectional contour of the channel. A mounting plane is formed by the central axes of the channels, which is to serve as a virtual reference variable. The fastening unit may in particular be a bolted connection or a plurality of bolted connections or the like, which are capable of fastening two profiled beams to one another. The contour and/or the threaded holes of the fastening unit may be configured such that the profiled beam may be fastened orthogonally to the main direction of extension of the profiled beam or substantially orthogonally to the main direction of extension in the mounting plane. In this context, substantially orthogonally means that the profiled beams may have an angular offset of ±0° to 20°.

Preferably, the plurality of profiled beams have a substantially identical cross-sectional area over the entire length of the profiled beams along the main direction of extension. An advantage of this embodiment may be that by simple means, for example the cutting of a profiled beam, an individual modular vehicle frame may be provided for an electric vehicle, as the profiled beams may be produced particularly cost-efficiently using the same cross-sectional area. The cross-sectional area of the profiled beams may in particular be determined using a perpendicular plane to the main direction of extension. In particular, a substantially identical cross-sectional area means a deviation of +0° to 20° of the cross-sectional area of a profiled beam.

Further preferably, the plurality of profiled beams has at least partially different lengths along the main direction of extension to form the modular vehicle frame. An advantage of this embodiment may be that a tool change in an extrusion system may be avoided, as the same profile of profiled beams may always be produced, as the profiled beam may be formed into the modular vehicle frame due to a length adjustment. The modular vehicle frame is thus produced from the profiled beam by simple means and in an inexpensive manner. For example, a first pair of profiled beams may have a first length and a second pair of profiled beams may have a second length. In this case, the first length of profiled beams may, for example, be a longitudinal beam and the second length of profiled beams may be suitable for forming a transverse beam.

Further preferably, the fastening unit comprises at least one threaded hole in a first profiled beam and a bore in a second profiled beam, such that the first profiled beam is connectable to the second profiled beam by means of a bolt. An advantage of this embodiment may be that with simple means in the form of the bore and the threaded hole, further aids for inserting the bolt are omitted, as the bore may form a centering effect in the second profiled beam. The bolt may thus be inserted into the threaded hole without any additional drilling or pressing. In this case, particularly preferably, two threaded holes next to each other may be provided in a first profiled beam, which abut two bores on a second profiled beam, so that the first profiled beam may be mounted in a tilt-resistant manner relative to the second profiled beam by means of two bolts.

Preferably, at least one of the projections of at least one profiled beam comprises two guide channels for forming a longitudinal projection within the profiled beam. An advantage of this embodiment may be that the guide channels may save further material and thus reduce an overall weight of the modular vehicle frame. Furthermore, the guide channels may be configured to increase the twist stiffness of the modular vehicle frame and the profiled beams. In other words, two channels are introduced into each projection of the profiled beam during extrusion to achieve the desired effects.

Further preferably, a thread is arranged between the two guide channels and the longitudinal projection. An advantage of this embodiment may be that the total weight of the modular vehicle frame may be reduced due to the guide channels, but at the same time a fastening option within the profiled beam is created to connect a plurality of profiled beams with one another. In other words, a projection comprises two guide channels, wherein a thread or a bore with a thread is provided between the two guide channels.

Preferably, the thread is arranged substantially orthogonally to the mounting plane or substantially orthogonally to the central axis of the channel of the profiled beam. An advantage of this embodiment may be that the thread or the bore with the thread may be arranged in two or more orientation directions within the projection between the two guide channels in order to thus fasten a further profiled beam to the profiled beam and fasten a connecting element to the profiled beam so that the deployment flexibility of a modular vehicle frame may be increased.

In other words, the thread or bore with the thread within the projection may be oriented substantially orthogonally to the mounting plane and thus substantially parallel to the direction of extension of the projection or substantially orthogonally to the central axis of the channel, such that the thread or bore with the thread lies transversely in the projection of the profiled beam. In this context, substantially orthogonally means a deviation of ±0° to 20°.

Preferably, a first thread is arranged substantially orthogonally to the central axis in a first longitudinal projection and a second thread is arranged substantially orthogonally to the mounting plane in a second longitudinal projection. An advantage of this embodiment may be that at one point of the profiled beam, both a further profiled beam may be connected to the profiled beam as well as a connecting element at the same point. In this context in particular, substantially orthogonally may comprise a deviation of ±0° to 20°. Thus, for example, the first thread or the first bore with the first thread may be arranged transversely to the direction of extension of the projection and the second thread or the second bore with the second thread may be arranged parallel to the direction of extension of the projection.

Further preferably, a first channel of the three channels of the profiled beam has a shorter length along the main direction of extension than the other channels. An advantage of this embodiment may be that the profiled beams may be reduced in terms of freedom of movement by means of the shoulder, which is created by the shorter first channel. Thus, the shorter length of the first channel may contribute to the stability of the modular vehicle frame.

Further preferably, the connecting element is extruded and is fastened to at least one of the profiled beams by means of a bolted connection. An advantage of this embodiment may be that with the extruded connecting element, a simple and inexpensive means is provided to fasten further vehicle components to the modular vehicle frame. Furthermore, these may be fastened by means of a bolted connection on the profiled beams, such that a synergy results between the fastening method of the profiled beams with each other and the profiled beams with the connecting elements, as a worker does not have to change the assembly tool in order to connect them with each other.

BRIEF DESCRIPTION OF THE DRAWINGS

A preferred exemplary embodiment of the invention is described in detail in the following with reference to the accompanying drawing. In the drawings are.

DETAILED DESCRIPTION

A modular vehicle frame for an electric vehicle according to a first preferred exemplary embodiment of the invention is described in detail in the following with reference to FIGS. 1 and 16.

Figure 1:
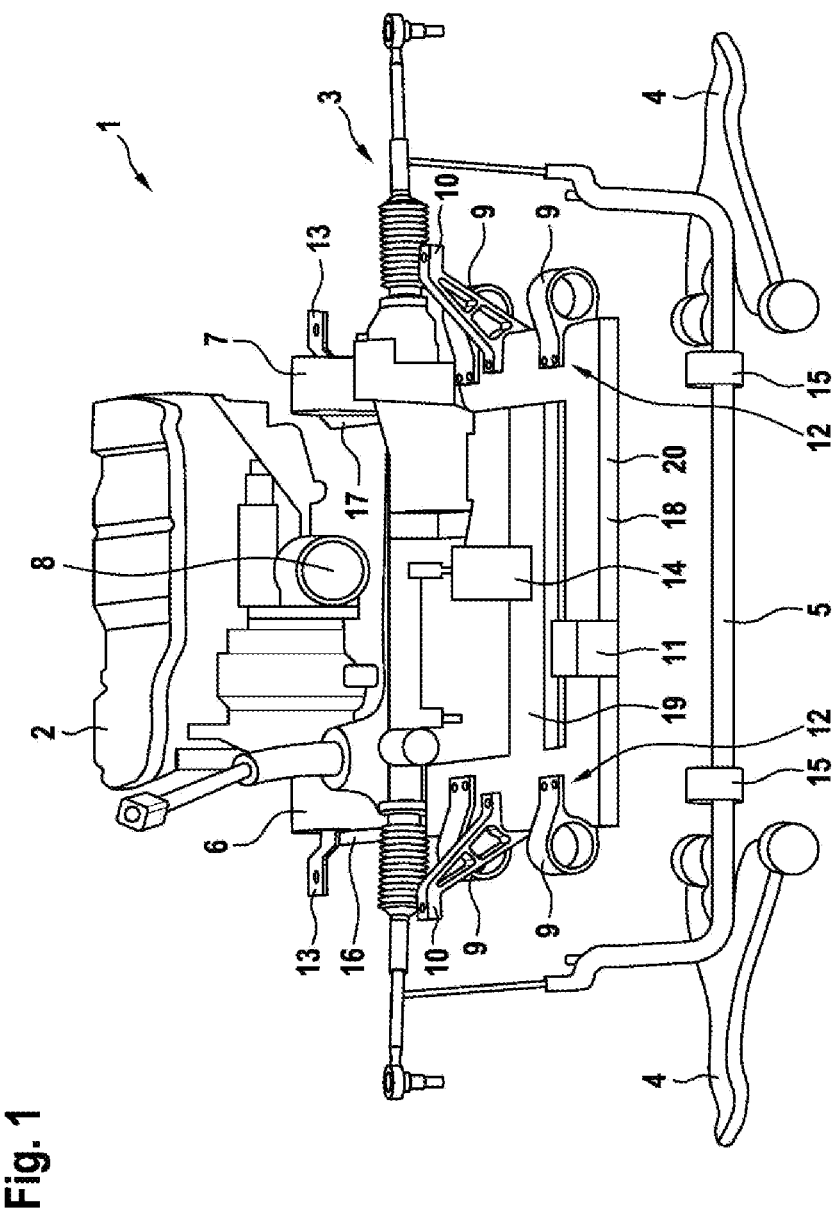
FIGS. 1 to 3 a perspective view of the modular vehicle frame according to a first exemplary embodiment of the invention, FIG. 4 an exploded view of the modular vehicle frame, FIG. 5 a side view of a profiled beam, FIG. 6 a sectional view of the modular vehicle frame along line A-A of FIG. 5, FIGS. 7 to 9 each a cross-sectional view of the profiled beam, FIG. 10 a partial sectional view of the profiled beam, FIG. 11 a cross-sectional view of the profiled beam, FIGS. 12 to 14 perspective views of the connecting element, FIG. 15 a cross-sectional view of the profiled beam, and FIG. 16 a perspective view of the connecting element.

FIG. 1 shows the vehicle frame 1 for an electric vehicle having a plurality of different attachment parts. The vehicle frame 1 comprises a connecting element, which may be implemented in a different way. The modular vehicle frame 1 may have a first motor bearing 6 and a second motor bearing 7 as the connecting element. The first motor bearing 6 and the second motor bearing 7 may be fastened to the modular vehicle frame 1 by means of a bolted connection 50.

Furthermore, the connecting element may be configured as a fastening element 10 in order to fasten a steering system 3 on the modular vehicle frame 1.

Moreover, the connecting element may be configured as a linkage element 9 for a wishbone 4. Furthermore, the connecting element may be configured as a fastening element 11, 12, which fastens the modular vehicle frame to the vehicle.

Furthermore, the connecting element may be configured as a linkage element 13 for a cooler unit.

Moreover, the connecting element may be configured as a linkage element 15 for a stabilizer 5.

Reference number 14, by way of example, denotes a linkage element for fastening a motor bearing 8 and/or steering system 3.

Furthermore, the vehicle frame 1 may comprise a profiled beam, in particular a first transverse profile 18 and a second transverse profile 19. Furthermore, however, the profiled beam may also be designed as a first longitudinal profile 16 and a second longitudinal profile 17 in order to form the vehicle frame 1. The longitudinal profiles 16, 17 and the transverse profiles 18, 19 may form a type of base frame 20 of the vehicle frame 1.

Figure 2:
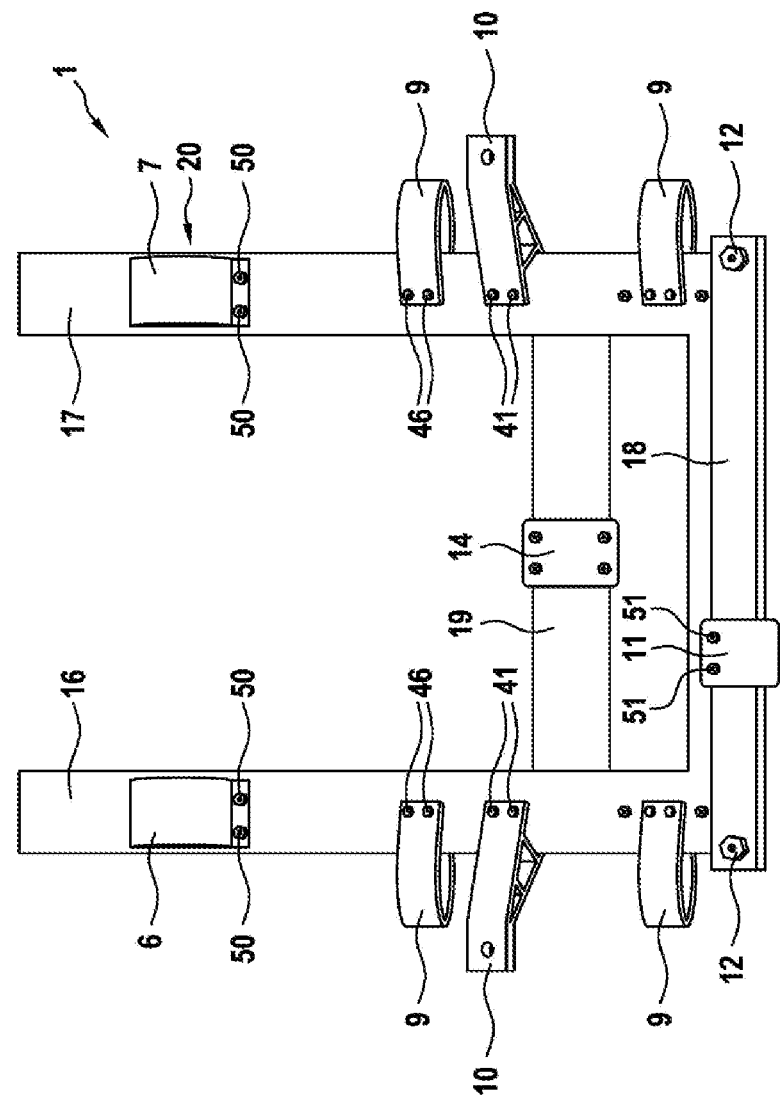

FIG. 2 shows a perspective view of the vehicle frame 1. The vehicle frame 1 is formed from the first longitudinal profile 16 and the second longitudinal profile 17, which are connected to each other by means of the transverse profiles 18, 19. On the modular vehicle frame 1, the first motor bearing 6 and the second motor bearing 7, which represent connecting elements, are fastened to the modular vehicle frame by means of a bolted connection 50. Furthermore, the linkage elements 9 for a wishbone 4 are fastened on the vehicle frame 1 by means of a bolted connection 46. Furthermore, the modular vehicle frame 1 comprises the fastening elements 10, which are configured to fasten a steering system 3 to the modular vehicle frame by means of a bolted connection 41. Furthermore, the modular vehicle frame 1 has the fastening elements 11, 12, which are configured to fasten the modular vehicle frame 1 to the vehicle, wherein the fastening elements 11, 12 are arranged with a bolted connection 51 on the profiled beam 18.

Figure 3:
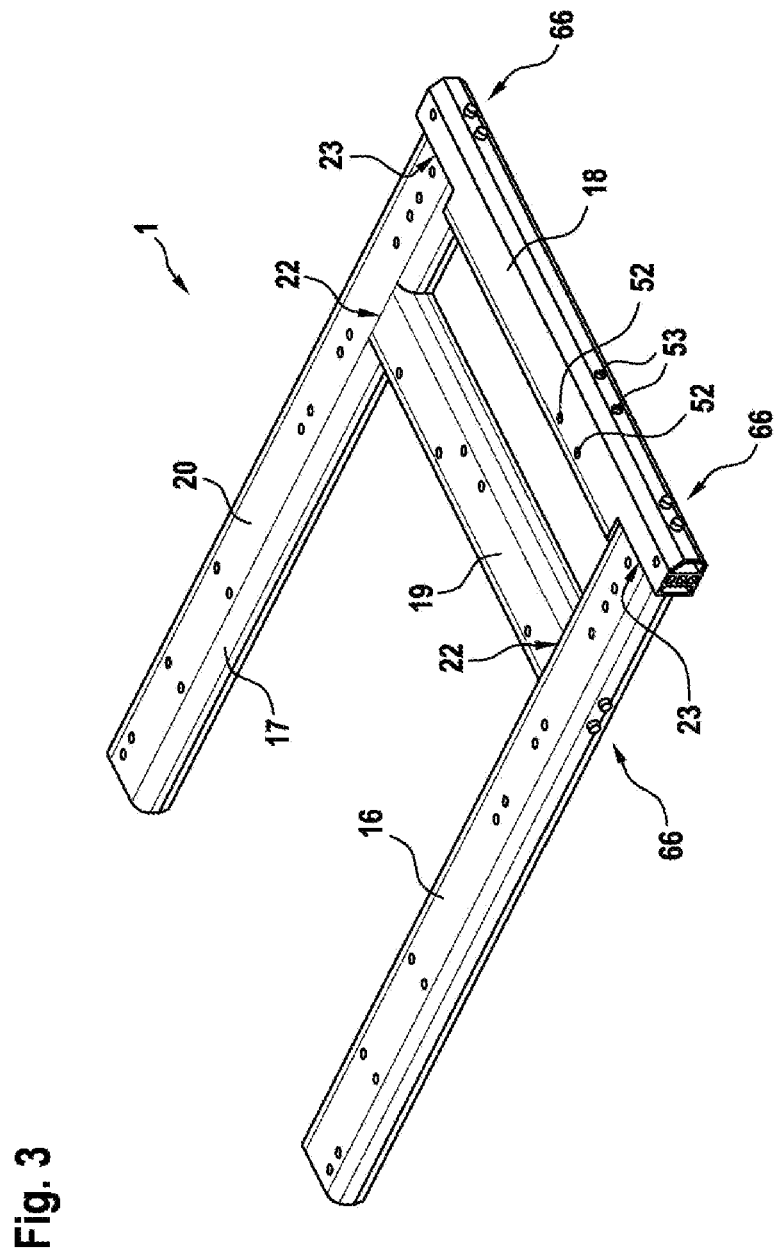

FIG. 3 shows the modular vehicle frame 1. The modular vehicle frame 1 comprises the first longitudinal profile 16 and the second longitudinal profile 17 as well as from the first transverse profile 18 and the second transverse profile 19. All of these profiles are profiled beams. Furthermore, the longitudinal profiles 16, 17 may have recesses 22, in which the second transverse profile 19 may engage and the second transverse profile 19 may be arranged using the recess 22 and a fastening unit 66 on the longitudinal profiles 16, 17. In addition, the first transverse profile 18 may have recesses 23 in which the longitudinal profiles 16, 17 engage on the front side, in order to thus fasten the longitudinal profiles 16, 17 to the first transverse profile 18, in particular by means of a bolted connection.

Figure 4:
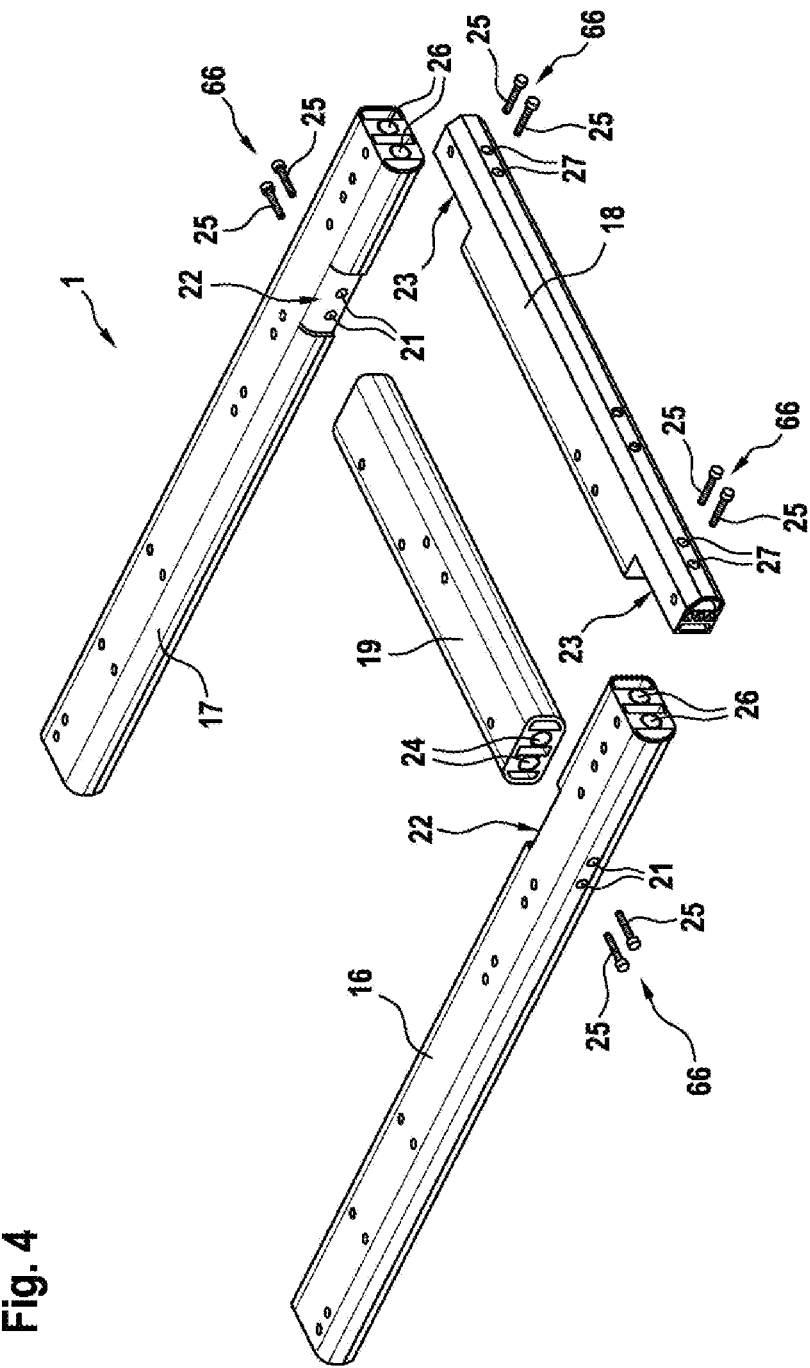

FIG. 4 shows an exploded view of the vehicle frame 1 of FIG. 3. The vehicle frame 1 consists of four profiled beams, which are configured as two longitudinal profiles 16, 17 and two transverse profiles 18, 19. The four profiled beams 16, 17, 18, 19 are fastened together by means of four fastening units 66. In the exemplary embodiment of FIG. 4, the fastening unit 66 is configured as a bolt-thread hole combination. The first longitudinal profile 16 comprises bores 21 in which the bolts 25 may be inserted, in order to bolt them to the threads 24 of the second transverse profile 19. Furthermore, the fastening unit 66 may comprise a recess 22 on the longitudinal profiled beam 16, 17. Furthermore, the transverse profiles 18, 19 may have bores 27 in which the bolts 25 are inserted, in order to be connected to the threads 26 of the longitudinal profiles 16, 17.

Figure 5:
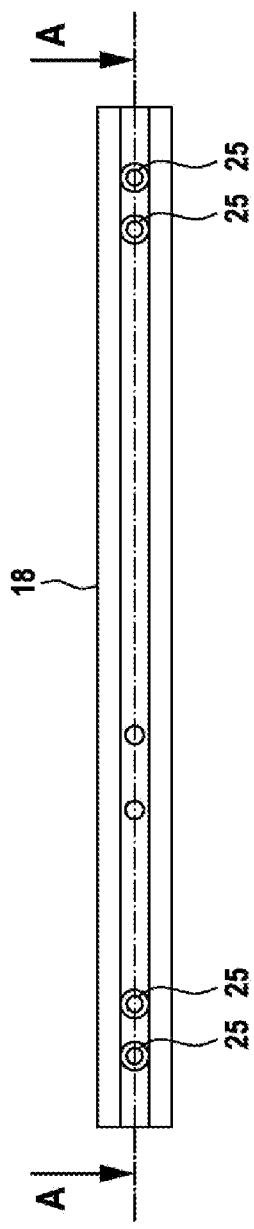

FIG. 5 shows a side view of the transverse profile 18.

Figure 6:
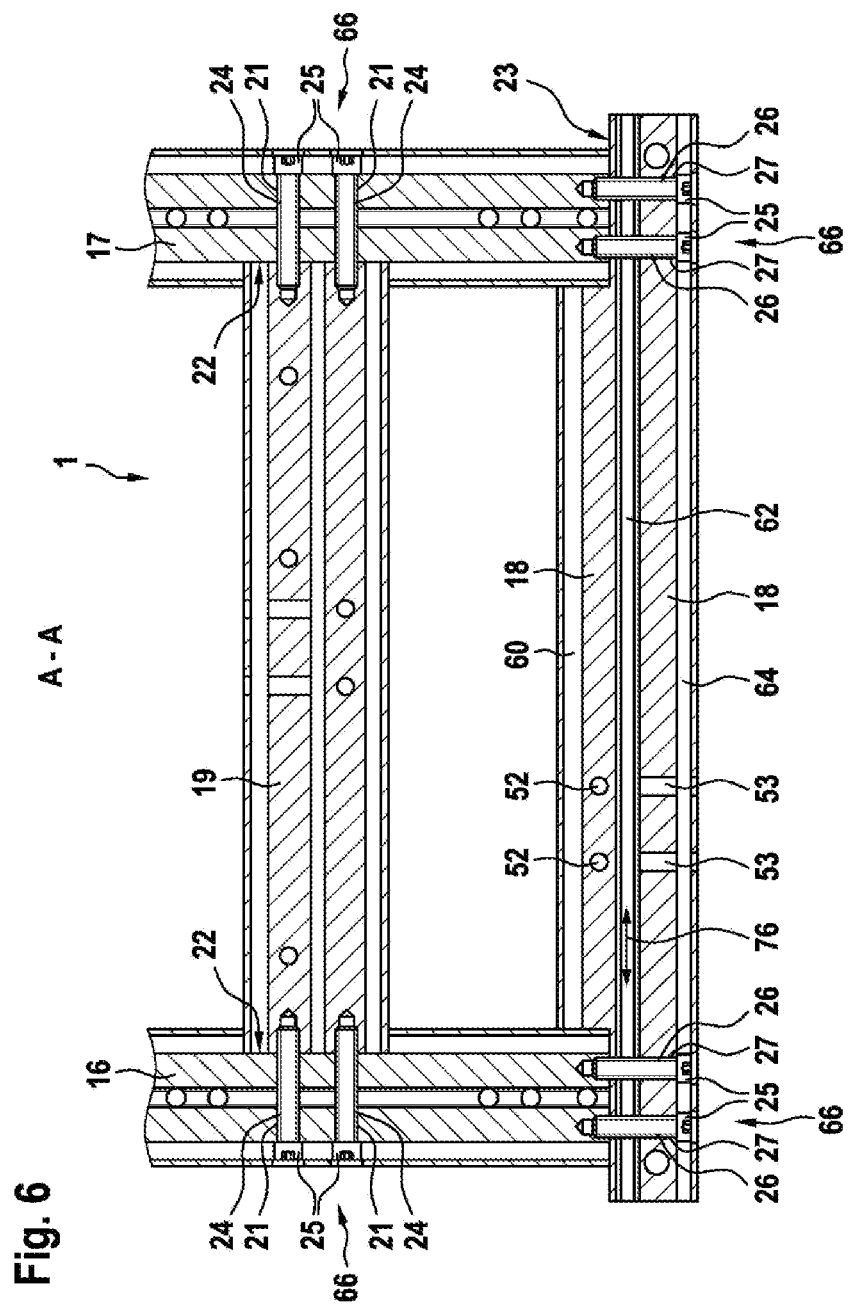

FIG. 6 shows a sectional view of the vehicle frame 1 in which the profiled beams are connected to each other by the fastening units 66. As shown in FIG. 6, the second transverse profile 19, which has threaded bores 24, is fastened by means of bolts 25 to the longitudinal profiles 16, 17, which are guided through the bores 21. Thus, the fastening unit 66 may be formed. Here, the transverse profiles 18, 19 are arranged orthogonally to the main direction of extension of the longitudinal profiles 16, 17.

Furthermore, the first transverse profile 18 is fastened to the longitudinal profiles 16, 17 by means of bolts 25. This may be done by the first transverse profile 18 having bores 27 through which the bolts 25 are guided, and wherein the bolts 25 are connected to the thread or threaded holes 26 to thus form the fastening unit 66.

Furthermore, the first transverse profile 18 may comprise a first channel 60, which has a shorter length than the other channels 62, 64 of the profiled beam along a main direction of extension 76 of the transverse profile 18. In FIG. 6, the second channel 62 and the third channel 64 have a longer extension length than the first channel 60. Furthermore, bores 52, 53 are arranged on the first transverse profile 18 to fasten a connecting element there, for example a fastening element 11 for fastening the vehicle frame 1 to an electric vehicle.

Figure 7:
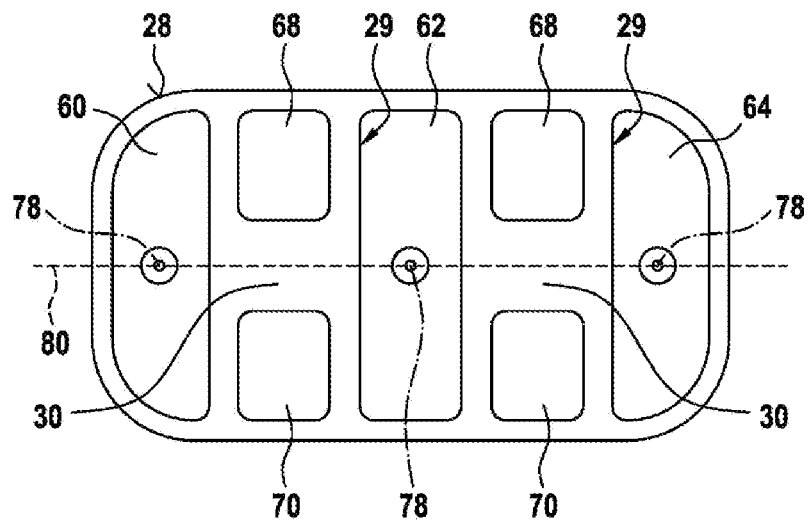

FIG. 7 shows a profile cross-section of the profiled beam. The profiled beam forms a lateral surface 28. Two projections 29 are arranged within the lateral surface 28. The projections 29 each comprise two guide channels 68, 70. A transverse projection 30 may exist between the guide channels 68, 70. Furthermore, the projections 29 within the profiled beam form three channels 60, 62, 64 each having a central axis 78. The mounting plane 80 is defined by the central axes 78.

Figure 8:
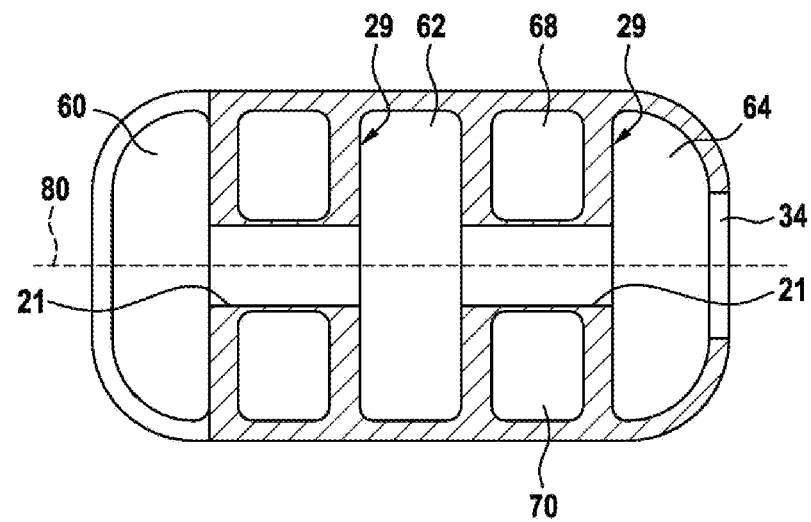

FIG. 8 shows a cross-section through a profiled beam in the area of a bore 21. The profiled beam comprises two projections 29. The first channel 60, the second channel 62, and the third channel 64 are formed by the two projections 29. A thread 21 or a bore with a thread 21 may be provided within the projections 29. In FIG. 8, the threads 21 are aligned parallel to the mounting plane 80. Furthermore, the profiled beam comprises a bore 34 through which a bolt 25 may be guided into the thread 21. The bolt 25 may in particular be bolted parallel to the mounting plane 80.

Figure 9:
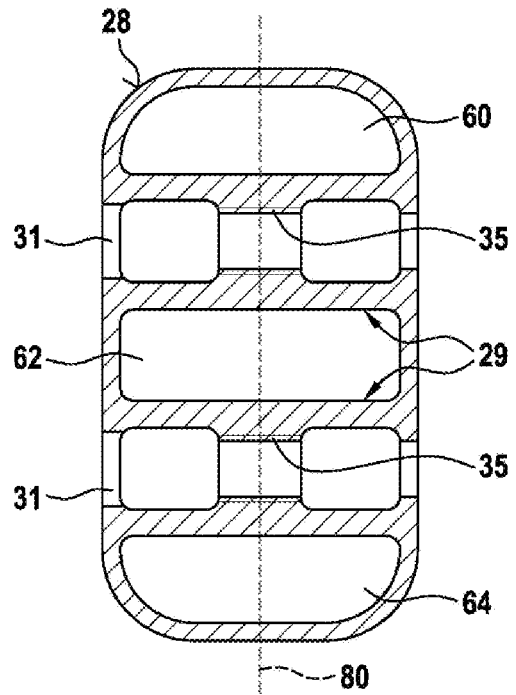

FIG. 9 shows a sectional view of the profiled beam. The profiled beam comprises two projections 29, thereby forming the first channel 60, the second channel 62, and the third channel 64. Threads or threaded holes 35 are arranged within the projection 29. The profiled beam has bores 31 in its lateral surface 28, into which bolts 25 may be inserted, so that they may be bolted to the threaded holes 35.

Figure 10:
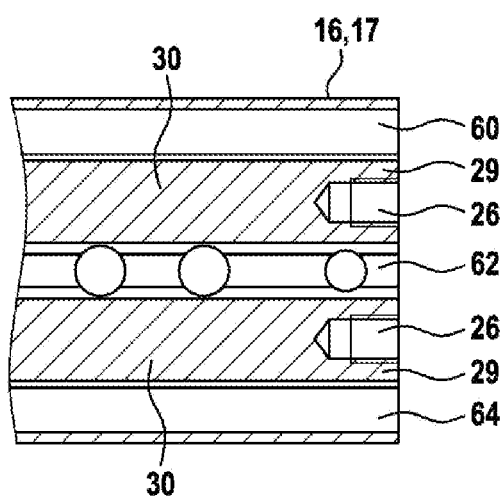

FIG. 10 shows a profiled beam, which may be configured as a longitudinal profile 16, 17. On the front face of the longitudinal profile 16, 17, the profiled beam comprises a thread or threaded holes 26, which are arranged within the projections 29. Thus, a plurality of profiled beams may be bolted together. The projections 29 may be configured as longitudinal projections 30.

Figure 11:
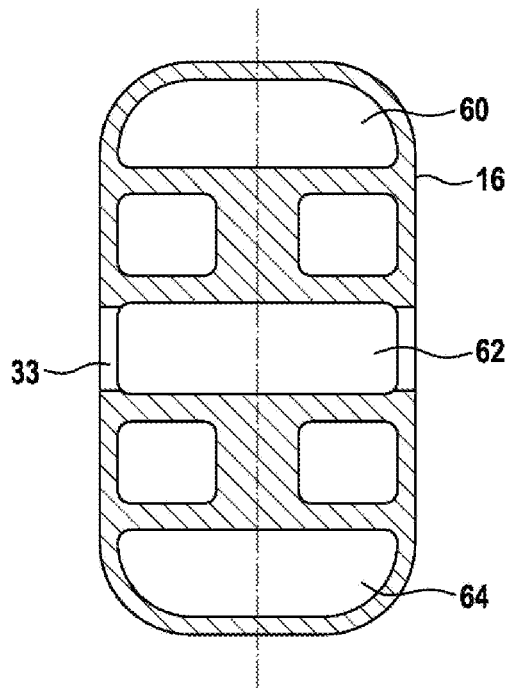

FIG. 11 shows a longitudinal profile 16, which comprises a continuous bore 33. The continuous bore 33 may be used, for example, to fasten a connecting element to the longitudinal profile 16.

Figure 12:
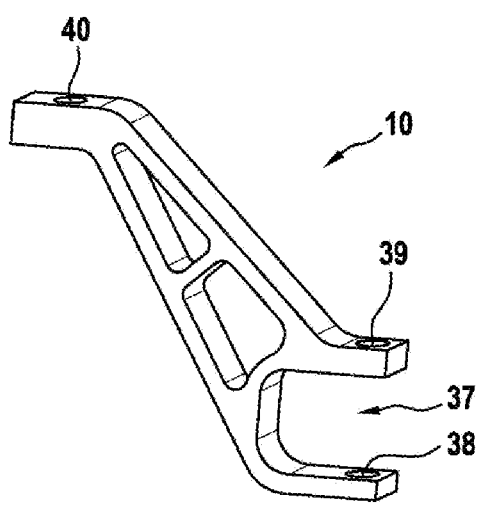

FIG. 12 shows one embodiment of the connecting element as the fastening element 10. The fastening element 10 may be configured to fasten a steering system 3 to the vehicle frame 1. The fastening element 10 comprises a bore 40 to which the steering system 3 may be fastened. In addition, the fastening element 10 comprises a bore 38 through which a bolt 25 may be guided into a thread 39. Between the bore 38 and the thread 39 is a recess 37 in which the profiled beam finds space.

Figure 13:
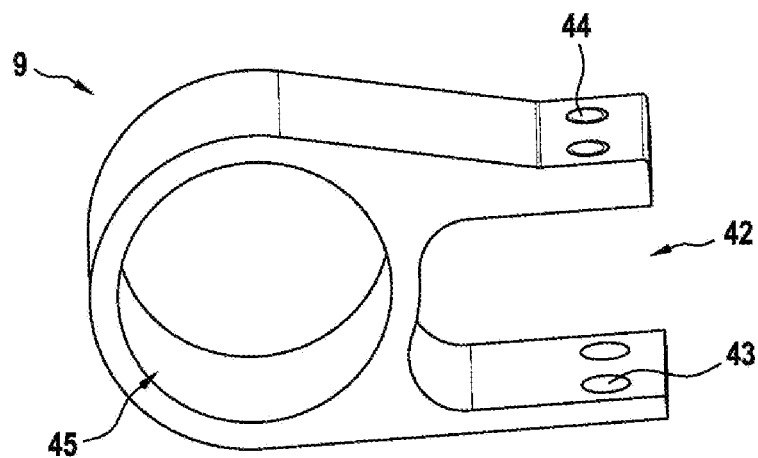

FIG. 13 shows one embodiment of the connecting element as a linkage element 9 for fastening the wishbone 4 to the vehicle frame 1. The linkage element 9 comprises a recess 45 for fastening the wishbone 4. The linkage element 9 may be bolted to the thread 44 by means of a bore 43 in which a bolt 25 may be guided. In this case, the linkage element 9 comprises a recess 42, which is formed so that it may be inserted onto a profiled beam.

Figure 14:
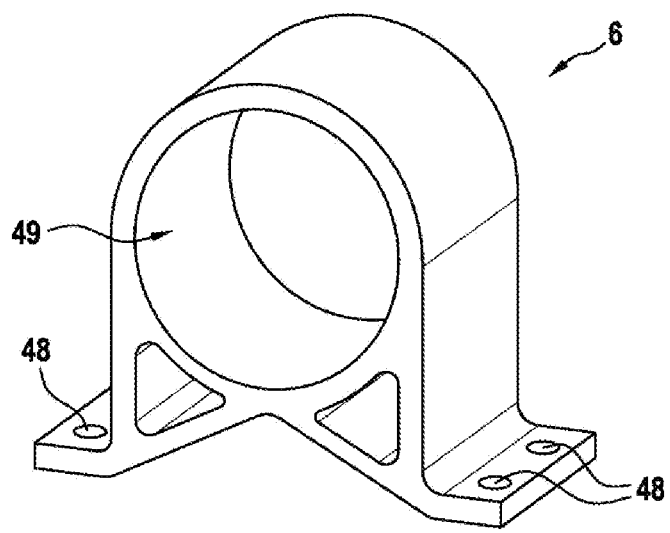

FIG. 14 shows a motor bearing 6, which comprises a recess 49 for fastening a part of the electric motor 2. The motor bearing 6 is configured in such a way that it rests in particular over its entire surface on a profiled beam and may be fastened to the profiled beam by means of bores 48.

Figure 15:
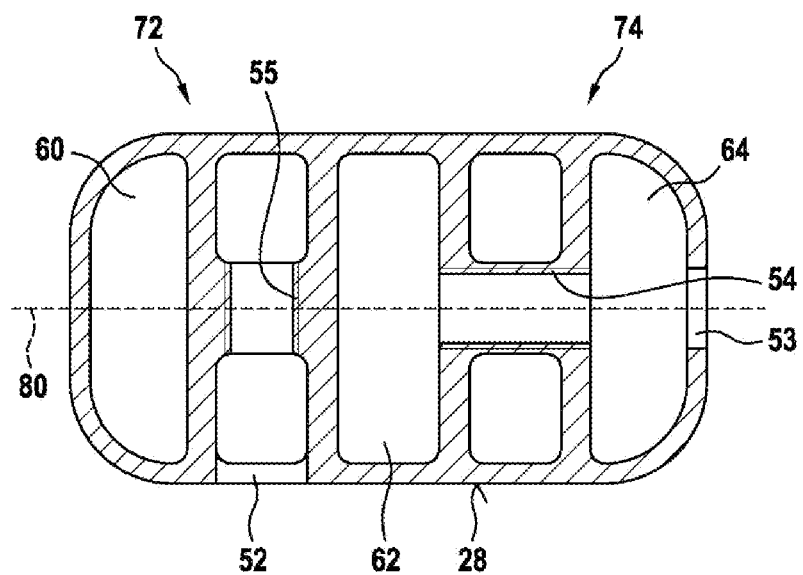

FIG. 15 shows a cross-section through the profiled beam, wherein the profiled beam comprises a first longitudinal projection 72 and a second longitudinal projection 74. A threaded hole 55 is arranged in the first longitudinal projection 72, in which a bolt 25 may engage. The profiled beam has a recess or bore 52 in its lateral surface 28 through which the bolt 25 may be guided into the threaded bore 55. Moreover, the second longitudinal projection 74 includes a further threaded hole 54 which is oriented parallel to the mounting plane 80. Thus, the first threaded hole 54 and the second threaded hole 55 are configured substantially orthogonally to each other. The profiled beam has a bore 53 in its lateral surface 28, through which the bolt 25 may be inserted into the threaded hole 54.

Figure 16:
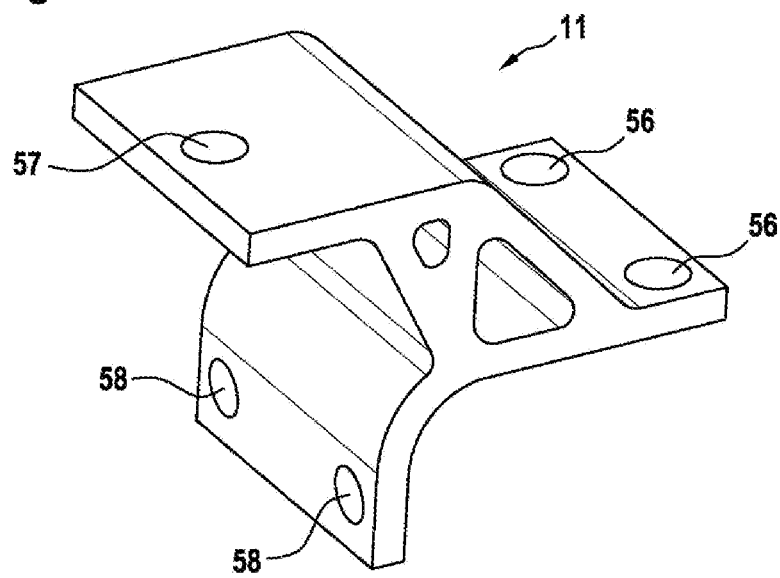

FIG. 16 shows a connecting element, configured as a fastening element 11, for fastening the vehicle frame 1 to the vehicle. The fastening element 11 may be fastened to two sides of the lateral surface 28 of the profiled beam by means of the bores 56, 58. Furthermore, the fastening element 11 comprises a projection on which a further bore 57 is arranged, for example to fasten the vehicle frame 1 to an electric vehicle.

What is claimed is:

1. A modular vehicle frame (1) for an electric vehicle, comprising a plurality of extruded profiled beams (16, 17, 18, 19), which have, at least in portions, an identical cross-sectional area, wherein: at least one connecting element (6, 7, 8, 9, 10, 11, 12, 13, 14) for an electric motor (2), a steering system (3), a cooler unit, and/or a suspension system (4) is arranged on the plurality of profiled beams (16, 17, 18, 19) via a frictional and/or interlocking connection; each profiled beam (16, 17, 18, 19) has a main direction of extension (76); each profiled beam (16, 17, 18, 19) has at least three channels (60, 62, 64) along the main direction of extension (76) which are formed by at least two projections (29) within the profiled beam (16, 17, 18, 19); each channel (60, 62, 64) forms a central axis (78) along the main direction of extension (76); a mounting plane is defined by the central axis (78); and the modular frame (1) has at least one fastening unit (66) which is configured to fasten the profiled beams (16, 17, 18, 19) substantially orthogonally to the main direction of extension (76), or substantially orthogonally to the main direction of extension (76) in the mounting plane, wherein at least one of the projections (29) of at least one profiled beam (16, 17, 18, 19) comprises two guide channels (68, 70) for forming a longitudinal projection (30) within the profiled beam (16, 17, 18, 19), wherein a first thread (54) is arranged substantially orthogonally to the central axis (78) in a first longitudinal projection (72), and a second thread (55) is arranged substantially orthogonally to the mounting plane in a second longitudinal projection (74).

2. The modular vehicle frame according to claim 1, wherein the plurality of profiled beams (16, 17, 18, 19) have an identical cross-sectional area over an entire length of the profiled beams (16, 17, 18, 19) along the main direction of extension (76).

3. The modular vehicle frame according to claim 1, wherein the plurality of profiled beams (16, 17, 18, 19) have at least partially different lengths along the main direction of extension (76) to form the modular vehicle frame (1).

4. The modular vehicle frame according to claim 1, wherein the fastening unit (66) comprises at least one threaded bore (24, 26) in a first profiled beam and a bore (21, 27) in a second profiled beam, such that the first profiled beam is connectable to the second profiled beam by a bolt (25).

5. The modular vehicle frame according to claim 1, wherein a thread (21) is arranged between the two guide channels (68, 70) and in the longitudinal projection (30).

6. The modular vehicle frame according to claim 5, wherein the thread (21) is arranged substantially orthogonally to the mounting plane or substantially orthogonally to the central axis (78) of one of the at least three channels (60, 62, 64) of the profiled beam (16, 17, 18, 19).

7. The modular vehicle frame according to claim 1, wherein a first channel (60) of the at least three channels (60, 62, 64) of the profiled beam (16, 17, 18, 19) has a shorter length along the main direction of extension (76) than the other channels (62, 64).

8. The modular vehicle frame according to claim 1, wherein the connecting element (6, 7, 8, 9, 10, 11, 12, 13, 14) is extruded and is fastened to at least one of the profiled beams (16, 17, 18, 19) by a bolted connection.

9. A modular vehicle frame (1) for an electric vehicle, comprising a plurality of extruded profiled beams (16, 17, 18, 19), which have, at least in portions, an identical cross-sectional area, wherein: at least one connecting element (6, 7, 8, 9, 10, 11, 12, 13, 14) for an electric motor (2), a steering system (3), a cooler unit, and/or a suspension system (4) is arranged on the plurality of profiled beams (16, 17, 18, 19) via a frictional and/or interlocking connection; each profiled beam (16, 17, 18, 19) has a main direction of extension (76); each profiled beam (16, 17, 18, 19) has at least three channels (60, 62, 64) along the main direction of extension (76) which are formed by at least two projections (29) within the profiled beam (16, 17, 18, 19); each channel (60, 62, 64) forms a central axis (78) along the main direction of extension (76); a mounting plane is defined by the central axis (78); and the modular frame (1) has at least one fastening unit (66) which is configured to fasten the profiled beams (16, 17, 18, 19) substantially orthogonally to the main direction of extension (76), or substantially orthogonally to the main direction of extension (76) in the mounting plane, wherein a first channel (60) of the at least three channels (60, 62, 64) of the profiled beam (16, 17, 18, 19) has a shorter length along the main direction of extension (76) than the other channels (62, 64).

10. The modular vehicle frame according to claim 9, wherein the plurality of profiled beams (16, 17, 18, 19) have an identical cross-sectional area over an entire length of the profiled beams (16, 17, 18, 19) along the main direction of extension (76).

11. The modular vehicle frame according to claim 9, wherein the plurality of profiled beams (16, 17, 18, 19) have at least partially different lengths along the main direction of extension (76) to form the modular vehicle frame (1).

12. The modular vehicle frame according to claim 9, wherein the fastening unit (66) comprises at least one threaded bore (24, 26) in a first profiled beam and a bore (21, 27) in a second profiled beam, such that the first profiled beam is connectable to the second profiled beam by a bolt (25).

13. The modular vehicle frame according to claim 9, wherein at least one of the projections (29) of at least one profiled beam (16, 17, 18, 19) comprises two guide channels (68, 70) for forming a longitudinal projection (30) within the profiled beam (16, 17, 18, 19).

14. The modular vehicle frame according to claim 13, wherein a thread (21) is arranged between the two guide channels (68, 70) and in the longitudinal projection (30).

15. The modular vehicle frame according to claim 14, wherein the thread (21) is arranged substantially orthogonally to the mounting plane or substantially orthogonally to the central axis (78) of one of the at least three channels (60, 62, 64) of the profiled beam (16, 17, 18, 19).

16. The modular vehicle frame according to claim 9, wherein the connecting element (6, 7, 8, 9, 10, 11, 12, 13, 14)

is extruded and is fastened to at least one of the profiled beams (16, 17, 18, 19) by a bolted connection.

\* \* \* \* \*